Reissued Nov. 30, 1948

Re. 23,052

UNITED STATES PATENT OFFICE 23,052

ADHESIVES FROM VEGETABLE PROTEINOUS MATERIAL

Glenn Davidson, Aurora, Ill.

No Drawing. Original No. 2,394,043, dated February 5, 1946, Serial No. 330,573, April 19, 1940. Application for reissue January 4, 1947, Serial No. 720,301

16 Claims. (Cl. 106—154)

A property of casein in adhesive usages which has given it very particular favor is the characteristic of making up in smooth homogeneous solution with water and alkali, such as to flow in uniform even-spreading condition. Naturally, this is of great advantage in precision usages where application of the adhesive in fine uniform layer is desired, such for instance as in paper coating and fine veneer work etc. On the other hand, vegetable proteinous adhesives, of which soya bean is illustrative, while having certain other advantageous properties, have had the drawback of making up in mushy or gruel-like condition, nonhomogeneous and thus disadvantageously different from casein. Much effort has been expended to obviate this deficiency, and many expedients have been proposed, but the problem in essence has remained unsolved, and the vegetable proteinous adhesives have been generally regarded as having this characteristic defect which must be taken along with the other properties which have rendered them commercially applicable, such as their low cost, general dependability etc. In accordance with the present invention, it now becomes possible to make up such vegetable proteinous materials to a smoothness and homogeneity like casein, and thereby further rounding out the characteristics of the material for precision and finer usages.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Vegetable proteinous material, such as soya bean flour, isolated soya bean protein, peanut flour, cotton seed flour, corn glutin, tung seed flour, and the like, have inherently the characteristic that they are naturally and primarily in association with oily and fatty substances. Indeed, the most convenient source of raw material for these proteins for adhesive usages is derived from the press cake or residue from which the oil has been separated. This fact of the general inherent affinity of the vegetable proteins with oily or fatty substances has been very generally ignored in the making up of adhesives from the protein. I have found however that by treating such vegetable proteinous material from the standpoint of taking account of its oil-affinities or its relationship possibilities with water-in-oil emulsions, a very great change may be brought about in the character of the solution or suspension, rendering it comparable in its homogeneity and viscosity-flow to casein. Together with this there is an improvement in bonding strength which is particularly noticeable and advantageous where an adhesive is to be spread thinly and evenly over large areas and is to be used for instance in surface-bonding, as in the case of paper coating and finishing.

In accordance with my invention, the vegetable proteinous materials are treated with a material capable of forming water-in-oil emulsions (and which for conciseness will be so designated hereinafter) and preferably which also contains a base-binding group. This base-binding group may or may not be satisfied. The materials capable of forming water-in-oil emulsions should contain a strongly hydrophilic group and be capable of radial molecular orientation in an oil film surrounding a water globule. Such substances as rosin, zinc and aluminum resinates, aluminum stearate etc. as heretofore proposed in adhesive mixtures do not meet this condition nor furnish the desired action and results. If however, rosin, for example, be dissolved in oleic acid with the addition of heat, a material capable of forming water-in-oil emulsions is obtained, and may be employed in carrying out the present invention. In general, it is desirable that such materials be capable of emulsifying as much as 30% of their weight of water and holding it for twenty-four hours or longer. Instead of relatively pure oleic acid, the fatty oil acids as split from the oils naturally associated with the proteinous materials, such as from soya bean oil, cotton seed oil, corn oil, peanut oil, etc., may be combined with rosin or a resin as above-indicated, to provide a material capable of forming water-in-oil emulsions. Other satisfactory materials forming water-in-oil emulsions are dichlor-oleic acid, the product resulting from chlorinating oleic acid directly with chlorine, chloro-hydroxy-oleic acid, the product resulting from treating oleic acid with hypochlorous acid, diglycol oleate, the products of zinc or calcium or aluminum resinate or stearate dissolved in diglycol oleate or oleic acid with heat as necessary, the oleic acid ester of ethylene diamine or diethylene triamine or triethylene tetra-amine, tall oil, which includes fatty acids and resin acids, and is a by-product recovered from certain paper pulp digester liquors, mahogany soaps or white oil soaps, which are the oil soluble substances recovered from sludges from treating white oils and like mineral oils with fuming sulphuric acid, lecithin, etc. The foregoing conveniently obtainable commercial substances capable of forming water-in-oil emulsions are representative of the material employed in treating the vegetable proteins in accordance with this invention. While any one of these may be employed, certain of them are outstanding in their combination of efficiency, low cost, and wide availability. Some materials capable of forming water-in-oil emulsions are somewhat more effective than others, and depending also upon the particular purpose in view for the adhesive, and the extent of effect desired, the amount of the material capable of forming water-in-oil emulsions used in treating the vegetable proteinous material may range from two to fifty pounds per each one hundred pounds of vegetable proteinous material.

For illustration, a remarkably good adhesive base may be made as follows: One hundred parts by weight of rosin is dissolved in one hundred parts by weight of soya bean fatty acid, with heat as necessary, and to this solution while still warm there is added one hundred parts of mahogany soap. This solution is then thoroughly mixed with three thousand parts by weight of soya bean flour.

To use this material for such purpose for instance as for laminating veneers or plywood, one hundred parts by weight of the afore-mentioned adhesive base is added to three hundred fifty-four parts by weight of water and is stirred until free from lumps. Advantageously, an agent such as pine oil may then be added in amount of about four parts by weight. Then five parts by weight of hydrated lime suspended in twenty-five parts of water, and forty parts of twenty per cent caustic soda solution are added in succession, stirring is continued for about twenty minutes, and the adhesive is ready for use.

In further illustration: The afore-mentioned adhesive base may be applied for paper coating usage by stirring one hundred parts by weight of the adhesive base in four hundred fifty parts by weight of cold water, until free of lumps. Then the mixture is heated to around 120° F., and thirty-three parts by weight of twenty per cent caustic soda solution is added, and the stirring is continued for about twenty minutes during which time the temperature is maintained at 125–130° F. Finally, water is added to bring the total weight up to six hundred parts. Then, with this there is incorporated a clay slip mixture or the like, such as suitable for coating or applying to paper. For instance, to this adhesive solution, per each ninety parts by weight there may be admixed one hundred parts by weight of coating clay (dry weight) in sixty-five parts by weight of water containing 0.75 part by weight of water glass and 0.16 of caustic soda. Where desired, this may be further thinned by adding water, as preferred in view of the thickness of coating desired, the treating conditions, etc.

Vegetable proteinous material as noted, may be made up with any of the materials capable of forming water-in-oil emulsions, and may be made to consistencies for spreading on wood, or other surfaces, or by appropriate inclusion of pigment or clay may be applied to paper.

I have found that if the vegetable proteinous material is brought into solution by treatment as described, and is precipitated by adding acid, not only is the protein precipitated, but it carries with it the material capable of forming water-in-oil emulsions particularly tenaciously combined.

Thus, a purified or extracted protein may be formed which has all the advantages of smooth solubility characteristic of the present invention and is also freed from hemi-celluloses etc., and is desirable for special uses. For example: One hundred parts of soya bean flour may be suspended in 500 parts of water and 10 parts of a solution of rosin in oleic acid added and the mixture well stirred. 30 parts 20% caustic soda solution is added. The temperature is then brought to 140° F. for 30 minutes. The mixture is diluted with 1,000 parts cold water. At this point the protein is all in solution and, if desired, the solution may be clarified by any suitable method such as filtration, sedimentation, centrifuging or some combination of these methods. However, if dehulled beans were used in making the meal from which the original flour was made, the percentage of insoluble material is relatively small, and in some cases at least, the solution need not be clarified. In any event, the solution of protein containing water-in-oil emulsifying agent, either with or without clarification is brought to a pH near 7.0 by the addition of an acid such as dilute hydrochloric acid. It is then inoculated with a very small amount of sour milk and allowed to stand for several hours. At the end of this time the protein will be separated as a curd much as casein separates when milk sours. At this stage, the pH of the mixture of the curd and whey will approximate 4.5. The curd is then washed with an abundance of water having a pH of 4.5. After washing, if desired, considerable of the entrained water may be removed from the curd by a continuous filter press of the Oliver type. The resulting pasty curd is then dried by exposing in thin layers to warm circulating air. For the best product, the temperature of this drying air should not be over 150° F. and in some cases, somewhat below such temperature.

It is understood that the above illustrates only one of many procedures of isolating vegetable protein in which the water-in-oil emulsifying agent may be used.

Other modes of applying the principle of the invention may be employed, change being made as regards the details described, provided the features stated in any of the following claims, or the equivalent of such, be employed.

I therefore particularly point out and distinctly claim as my invention:

1. A process of making an adhesive, which comprises heating one hundred parts by weight of soya bean oil fatty acid and dissolving therein one hundred parts of rosin, while still warm incorporating one hundred parts of mahogany soap, and then mixing with three thousand parts of soya bean flour, then stirring one hundred parts of this with four hundred and fifty parts by weight of cold water, then heating the mass to about 120° F., adding thirty-three parts by weight of twenty per cent caustic soda solution, stirring, adding water to bring the total weight up to six hundred parts, then mixing with coating clay at the rate of one hundred parts (dry weight) of clay in sixty-five parts by weight of water and 0.75 part of water glass and 0.16 of caustic soda per each ninety parts by weight of the adhesive mixture.

2. A process of making an adhesive, which comprises heating one hundred parts by weight of soya bean oil fatty acid and dissolving therein one hundred parts of rosin, while still warm incorporating one hundred parts of mahogany soap, and then mixing with three thousand parts of soya bean flour, then with each one hundred parts by weight of this incorporating, in succession, three hundred fifty-four parts by weight of water, four parts of pine oil, five parts of hydrated lime suspended in twenty-five parts of water, and forty parts by weight of caustic soda solution, based on this total of five hundred twenty-eight parts and stirring thoroughly.

3. A process of making an adhesive, which comprises dissolving rosin in about an equal amount of soya bean oil fatty acid, admixing about ten parts thereof with about one hundred parts by weight of soya bean flour and about five hundred parts of water, based on such total of six hundred ten parts, and an alkalin agent to dissolve the protein, and adding acid and precipitating the protein.

4. A process of making an adhesive, which comprises dissolving rosin in about an equal amount of a fatty oil acid, then incorporating about an equal amount of mahogany soap, and mixing with vegetable proteinous material, incorporating with cold water, then heating moderately and adding caustic alkali solution for dispersion, thinning with water, and mixing with a suspension of clay to desired consistency.

5. A process of making an adhesive, which comprises dissolving rosin in about an equal amount of a fatty oil acid, then incorporating mahogany soap, and mixing with vegetable proteinous material, and adding water, hydrated lime, and caustic alkali for dispersion, in succession.

6. Adhesive material, consisting essentially of soya bean flour mixed with about 2–50 pounds per hundred thereof of water-in-oil emulsion forming material including mahogany soap and soya bean oil fatty acid with rosin together with caustic alkali for desired spreading consistency, and clay.

7. Adhesive material, consisting essentially of soya bean flour mixed with about 2–50 pounds per hundred thereof of water-in-oil emulsion forming material including mahogany soap and soya bean oil fatty acid with rosin, together with caustic alkali for desired spreading consistency, and hydrated lime.

8. Adhesive material, consisting essentially of a protein acid-precipitated from a combination of soya bean flour, soya bean oil fatty acid and rosin, and an alkalin agent for dispersion.

9. Adhesive material, consisting essentially of vegetable proteinous material mixed with about 2–50 pounds per hundred thereof of water-in-oil emulsion forming material including mahogany soap and a fatty oil acid with rosin, together with caustic alkali for desired spreading consistency, and clay.

10. Adhesive material, consisting essentially of a product acid-precipitated from vegetable proteinous material mixed with a fatty oil acid and rosin and mahogany soap in the absence of alkali, and finally with an alkalin agent.

11. An adhesive material consisting essentially of a product acid-precipitated from vegetable proteinous material mixed with a mahogany soap in the absence of alkali, and finally with an alkalin agent.

12. An adhesive material consisting essentially of a product acid-precipitated from soya bean flour mixed with a mahogany soap in the absence of alkali, and finally with an alkalin agent.

13. An adhesive material consisting essentially of vegetable proteinous material and about 2–50 pounds per hundred thereof of a mahogany soap, and an alkali to give the desired consistency.

14. An adhesive material consisting essentially of soya bean flour and about 2–50 pounds per hundred thereof of a mahogany soap, and an alkali to give the desired consistency.

15. For adhesive usages, a vegetable proteinous adhesive material containing per each 100 pounds about 2 to 50 pounds of a mahogany soap, and an alkali to give the desired consistency.

16. For adhesive usages, a soya bean flour adhesive material containing per each 100 pounds about 2 to 50 pounds of a mahogany soap, and an alkali to give the desired consistency.

GLENN DAVIDSON.

REFERENCES CITED

The following references are of record in the file of this patent:

UNITED STATES PATENTS

| Number | Name | Date |
|---|---|---|
| 2,253,517 | Heberer | Aug. 26, 1941 |